United States Patent [19]
Eschbach

[11] Patent Number: 5,341,224
[45] Date of Patent: Aug. 23, 1994

[54] IMAGE PROCESSING SYSTEM AND METHOD FOR EMPLOYING ADAPTIVE SCANNING OF HALFTONES TO PROVIDE BETTER PRINTABLE IMAGES

[75] Inventor: Reiner Eschbach, Webster, N.Y.

[73] Assignee: Xerox Corporation, Stamford, Conn.

[21] Appl. No.: 870,066

[22] Filed: Apr. 17, 1992

[51] Int. Cl.⁵ .............................................. H04N 1/40
[52] U.S. Cl. ..................... 358/456; 358/455; 358/466; 358/458; 358/465; 382/50; 382/54
[58] Field of Search ............... 358/456, 455, 458, 465, 358/464, 462, 463, 466; 382/50, 52

[56] References Cited

U.S. PATENT DOCUMENTS

| | | | |
|---|---|---|---|
| 2,892,887 | 6/1959 | Hell | 358/455 |
| 2,962,550 | 11/1960 | Brink | 358/455 |
| 3,249,690 | 5/1966 | Schubert | 358/455 |
| 4,084,196 | 4/1978 | Tisue et al. | 358/455 |
| 4,259,694 | 3/1981 | Liao | 358/455 |
| 4,468,705 | 8/1984 | Burton | 358/447 |
| 4,554,593 | 11/1985 | Fox et al. | 358/455 |
| 4,633,327 | 12/1986 | Roetling | 358/456 |
| 4,638,369 | 1/1987 | Hsieh | 358/456 |
| 4,667,250 | 5/1987 | Murai | 358/456 |
| 4,730,221 | 3/1988 | Roetling | 358/456 |
| 4,782,398 | 11/1988 | Mita | 358/456 |
| 4,926,267 | 5/1990 | Shu et al. | 358/456 |
| 4,977,605 | 12/1990 | Fardeau et al. | 358/456 |
| 5,053,887 | 10/1991 | Thompson | 358/456 |
| 5,125,045 | 6/1992 | Murakami et al. | 358/456 |

*Primary Examiner*—Edward L. Coles, Sr.
*Assistant Examiner*—Fan Lee
*Attorney, Agent, or Firm*—Finnegan, Henderson, Farabow, Garrett & Dunner

[57] ABSTRACT

An image processing system employs a scanner to generate an image having gray content from an input halftone image. The system further includes a programmed computer that determines whether each pixel is a constant area pixel or an edge area pixel. Each constant area pixel is detected to be a white pixel or a black pixel and the white or black value is set with reference to a local black or white reference point. The local reference point is then adjusted as a function of the input value of each constant area pixel. Each edge area pixel is detected to be a local-extremum pixel or a nonextremum pixel. The value of each local-extremum pixel is modified as a function of the current local reference point. The local reference point is also adjusted as a function of the value of each local-extremum or nonextremum pixel after it is detected. The modified constant and edge area pixels are stored as a modified image for output processing.

17 Claims, 7 Drawing Sheets

FIG. 3-1A
(BLOCKS 46-48)

INPUT VALUES

| 7 | 10 | |
|---|---|---|
| 9 | 9 | 9 |
| 12 | 7 | |
| 9 | 9 | |

(with circle around center 9 and 12)

FIG. 3-1B

LOCAL DERIVATIVE

| 2 | 0 | 1 |
|---|---|---|
| 3 | X | 2 |
| 0 | 0 | 3 |

→ ABSOLUTE VALUES OF 9-12 = 3

LOCAL AREA MAXIMUM = MAX (e.g. 200) AREA e.g.: 11x3
LOCAL AREA MINIMUM = MIN (e.g. 7)
CURRENT ESTIMATED WHITEPOINT = WHITE (e.g. 195)
CURRENT ESTIMATED BLACKPOINT = BLACK (e.g. 7)
CURRENT POINT = 9

CURRENT POINT IS CLOSER TO MINIMUM (7) THAN TO MAXIMUM (200) RETURN BLACK

NO VALUE IS > Δd (32)
THEREFOR: CONSTANT AREA PIXEL:
BLACK OR WHITE

CURRENT POINT > WHITE ? YES -> RETURN WHITE [NO]
CURRENT POINT < BLACK ? YES -> RETURN BLACK [NO]

FIG. 3-2A
(BLOCKS 46-60)

INPUT VALUES

| 7 | 10 | |
|---|---|---|
| 9 | 9 | 7 |
| 12 | 56 | |
| 9 | 55 | |

FIG. 3-2B

LOCAL DERIVATIVE

| 2 | 0 | 1 |
|---|---|---|
| 3 | X | 2 |
| 0 | 46 | 47 |

→ ABSOLUTE VALUES OF 9-56 = 47

AT LEAST ONE VALUE IS > Δd (32)
THEREFOR: NON CONSTANT AREA PIXEL:

FIG. 3-2C

| 7 | 10 | |
|---|---|---|
| 9 | 9 | 12 |
| 12 | 7 | |
| 8 | 9 | |

IS CENTER PIXEL LOCAL EXTREMUM? NO
(AT LEAST ONE PIXEL SMALLER BY Δe (32) THAN CURRENT PIXEL AND
AT LEAST ONE PIXEL BY Δe THAN CURRENT PIXEL)

RETURN: EDGE PIXEL

FIG. 3-3A
(BLOCKS 46-60)
INPUT VALUES

| 140 | 150 | 150 |
|-----|-----|-----|
| 112 | 9   | 156 |
| 156 | 155 | 156 |

ABSOLUTE VALUES OF 9-156 = 147

FIG. 3-3B
LOCAL DERIVATIVE

| 131 | 147 | 141 |
|-----|-----|-----|
| 3   | X   | 141 |
| 146 | 146 | 147 |

AT LEAST ONE VALUE IS > $\Delta d$ (32)
THEREFOR: NON CONSTANT AREA PIXEL:

FIG. 3-3C

| 140 | 156 | 150 |
|-----|-----|-----|
| 112 | 9   | 150 |
| 155 | 155 | 156 |

IS CENTER PIXEL LOCAL EXTREMUM? YES
LOCAL PIXEL IS AT LEAST $\Delta e$ (32) SMALLER THAN ANY OTHER PIXEL
RETURN: LOCAL MINIMUM

IMAGE PROCESSING SYSTEM AND METHOD FOR EMPLOYING ADAPTIVE SCANNING OF HALFTONES TO PROVIDE BETTER PRINTABLE IMAGES

BACKGROUND OF THE INVENTION

The present invention relates to image processing systems and methods and more particularly to systems and methods for scanning halftone images to make quality copies or prints.

Various kinds of machines or systems employ a scanner to obtain an image of a document for further processing leading to reproduction, copying, or printing of the document. For example, copy machines employ a platen on which a document is placed for scanning, with the scanned electronic image being processed by the machine to produce one or more copies. Similarly, a FAX machine employs a scanner to obtain an image of an inserted document, with the scanned electronic image being processed by the machine to generate a local or remote copy. A printer system may also employ a separate scanner to obtain an electronic image of a document to be printed, and the electronic image may then be processed by a separate computer system to generate an image in a form ready for printing by the system printer.

In the prior art, the scanning and subsequent processing of black-and-white and color halftone or binary images, such as those found in newspapers and magazines, has typically resulted in undesirable loss of detail in the output copies or prints. Normally, such loss of image detail has resulted in part from an inability of the total system including the scanner to respond to relatively high spatial gradients across edges contained in the image. Loss of image detail in the prior art has also resulted from an inability of entire systems to compensate for variation in printing density or paper density across the original image, such as faded inks, stains, rubbed areas, etc.

With respect to high spatial gradients in images to be reproduced, the conventional scanner typically has a resolution comparable to the resolution with which the image to be reproduced was created. The scanner is thus enabled to read accurately image areas having low and medium spatial gradients, but it is limited in reading areas such as edges having high spatial gradients.

For example, edge areas are typically read such that gray pixels result at the borders between black and white areas in a black and white image. Thus, the aperture of the scanner bridges multiple image pixels which are value averaged, and, at the edges, the averaging of black and white pixels results in gray pixels. The end effect is that image detail is lost.

The following prior art has limited relevance to the present invention:

1. U.S. Pat. No. 4,926,267, entitled "Reproduction of Halftone Original With Reduced Moire," dated May 15, 1990, and issued to J. Shu, et al.

2. U.S. Pat. No. 4,977,605, entitled "Binary Quantification of an Image Having Multiple Levels of Greys", dated Dec. 11, 1990, and issued to Fardeau, et al.

3. U.S. Pat. No. 4,468,705, entitled "Data Transition Enhancement", dated Aug. 28, 1984, and issued to Jack D. Burton.

4. U.S. Pat. No. 4,876,610, entitled "Image Processing Apparatus With Binarization-Error Dispersal", dated Oct. 24, 1989, and issued to H. Ohsawa et al.

5. U.S. Pat. No. 2,892,887, entitled "Apparatus For Producing Screened Printing Forms With Automatic Correction of Tone Values", dated Jun. 30, 1959, and issued to Rudolf Hell.

6. U.S. Pat. No. 4,554,593, entitled "Universal Thresholder/Discriminator", dated Nov. 19, 1985, and issued to Sidney J. Fox, et al.

7. U.S. Pat. No. 4,259,694, entitled "Electronic Rescreen Technique for Halftone Picture", dated Mar. 31, 1981, and issued to Henry H. Liao.

8. U.S. Pat. No. 4,638,369, entitled "Edge Extraction Technique", dated Jan. 20, 1987, and issued to Robert C. Hsieh.

9. U.S. Pat. No. 2,962,550, entitled "Resolution Restorer System", dated Nov. 29, 1960, and issued to Robert M. Brink.

10. U.S. Pat. No. 3,249,690, entitled "Video Quantizer Producing Binary Output Signals at Inflection Points of Input Signal", dated May 3, 1966, and issued to Ernest J. Schubert.

11. U.S. Pat. No. 4,633,327, entitled "Enhancement Halftoning", dated Dec. 30, 1986, and issued to Paul G. Roetling.

12. U.S. Pat. No. 4,730,221, entitled "Screening Techniques by Identification of Constant Grey Components", dated Mar. 8, 1988, and issued to Paul G. Roetling.

SUMMARY OF THE INVENTION

It is an object of the present invention to provide a new image processing system that scans and processes input halftone images to produce output halftone images with improved quality.

Accordingly, an image processing system for scanning and reproducing halftone images comprises means for scanning an input halftone image to generate an image having gray content and means for detecting whether each pixel of the input image is a constant area pixel or an edge area pixel.

Means are provided for estimating a local black/white reference point as a function of reference point values in a predetermined pixel neighborhood. Second means are provided for detecting whether each constant area pixel has an input value that makes it a white pixel or a black pixel relative to the local current black/white reference point for the detected constant area pixel.

First means are provided for modifying the input value of each detected constant area pixel to a predetermined white value or a predetermined black value in accordance with the detecting result from the second detecting means.

Means are provided for setting the value of the local black/white reference point for each detected constant area pixel to a calculated value for that pixel. Second means are provided for modifying an input value of each detected edge area pixel as a function of the local black/white reference point for the detected edge area pixel.

Means are provided for adjusting the local reference points, for each of at least some detected edge area pixels, and means are provided for storing the modified constant and edge area pixels as a modified image for output processing.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention. In the drawings:

FIGS. 3-1A through 3-3C are schematic diagrams that illustrate determinations of constant or non-constant area pixels and local extremums in accordance with the flow chart of FIG. 3;

DESCRIPTION OF THE PREFERRED EMBODIMENT

Reference will now be made in detail to the presently preferred embodiments of the invention, an example of which is illustrated in the accompanying drawings.

Figure 1:
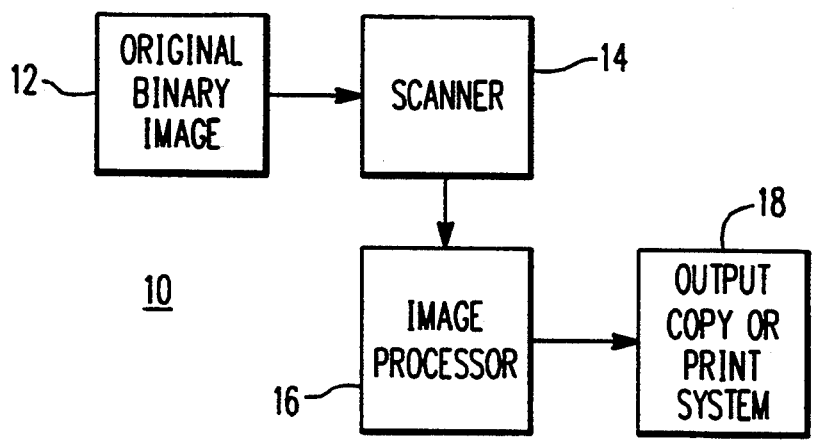
FIG. 1 shows a block diagram of a reproduction system in which the present invention is embodied to provide better copying or printing of halftone images.

In FIG. 1, a system 10 is provided in accordance with the preferred embodiment of the invention to reproduce an original binary or halftone image 12 which generally may be a color or a black-and-white image but in this case is a black-and-white binary image. In the text herein, the term black-and-white is used in the sense of a binary image. However, the term white in all cases refers to a white value at a specific location of a scanned original page or paper, and the term black refers to the value of the ink/toner at a specific page location. Black and white are not constant over the page so that only the relation that black at a specific point is darker than white at that specific point holds. The black at one area of the page might actually be lighter than the white at a second totally different area of the page, e.g., the ink/toner at a rubbed area of the page might be lighter than a stained area of the page. However, in such a case, the toner in the first rubbed area is darker than the paper in the same first area and the second stained area is lighter than the toner in the same second area.

The system 10 includes a scanner 14 for reading the image 12 and an image processor 16 that employs principles of the invention in processing the image 12 for application to a copy or print system 18. While the preferred embodiment is structured to process a binary input image, the invention generally can be applied to input images having multiple tone levels, i.e., an n-tone image.

The system 10 may, for example, be a copy machine having a platen on which the original document 12 is placed, and wherein the scanner 14, the image processor 16, and a copy system 18 are integral parts of the copy machine. As another example, the system 10 may be a printer system in which the scanner 14 is a separate unit that is coupled to the image processor 16 in the form of a separate computer system, and in turn the processor 16 is linked to a separate printing system 18.

Figure 2:
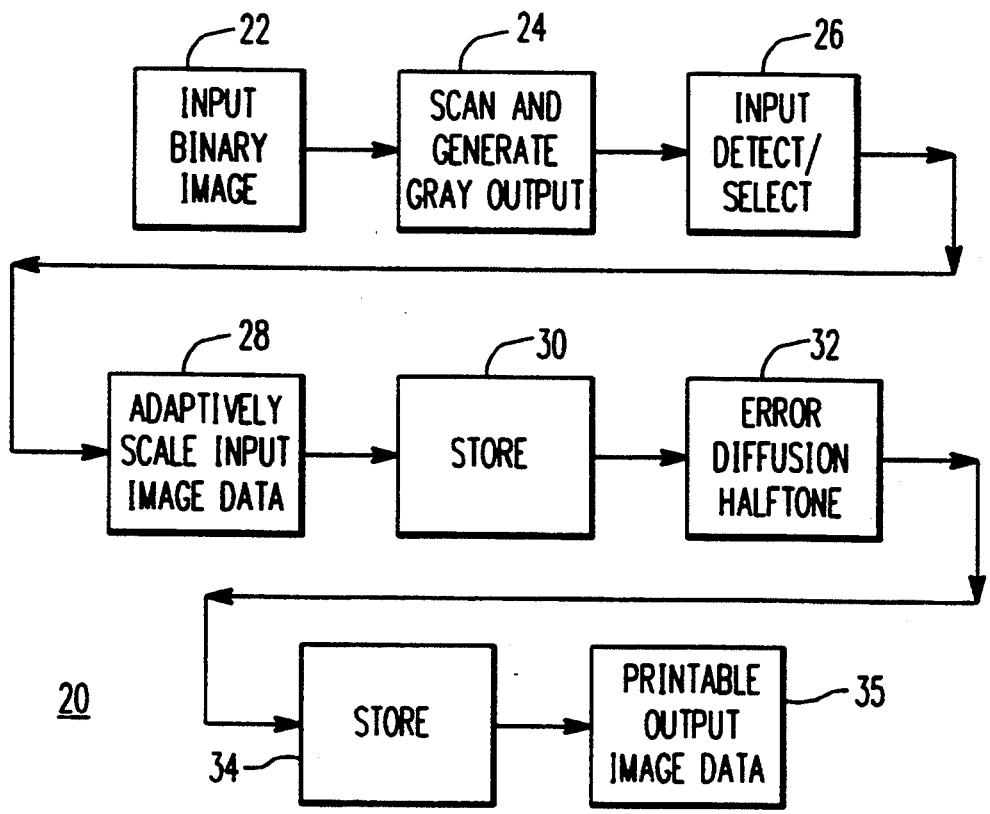
FIG. 2 shows a functional block diagram for a general process performed in the system of FIG. 1 in accordance with the invention.

The preferred general process performed in the system 10 in accordance with the present invention is illustrated by a flow diagram 20 in FIG. 2. Thus, data from a halftone image 22 is applied as an input to a process step 24 in which the data is scanned to generate an output image with gray content.

Next, an optional step 26 provides an input detection/selection in which a text halftone segmentation can be performed by standard software tools or, selectively, by user interventions. Only the data containing high spatial gradients is transferred to the next block when the optional step 26 is selected.

A step 28 adaptively scales the input image values in accordance with the invention and sends the results to storage as indicated by a block 30. Preferably, the stored image is halftoned by an error diffusion procedure 32 and stored by a block 34 as printable output image data 35 for the system 18.

Generally, procedures employed in accordance with the present invention are implemented by an algorithm based on the following assumptions:

a. Scanning of a binary input results in gray pixels at the borders between black and white regions;

b. Constant areas in the scanned data (m×n pixels) are either black or white and allow the estimation of the local black/whitepoint on the page, i.e., the value the scanner sees at that pixel when the input was either a blank page (whitepoint) or solid toner (blackpoint); and c. Local extrema in the scanned data represent single (or small) black or white features that also allow the estimation of local black/whitepoints.

Figure 3:
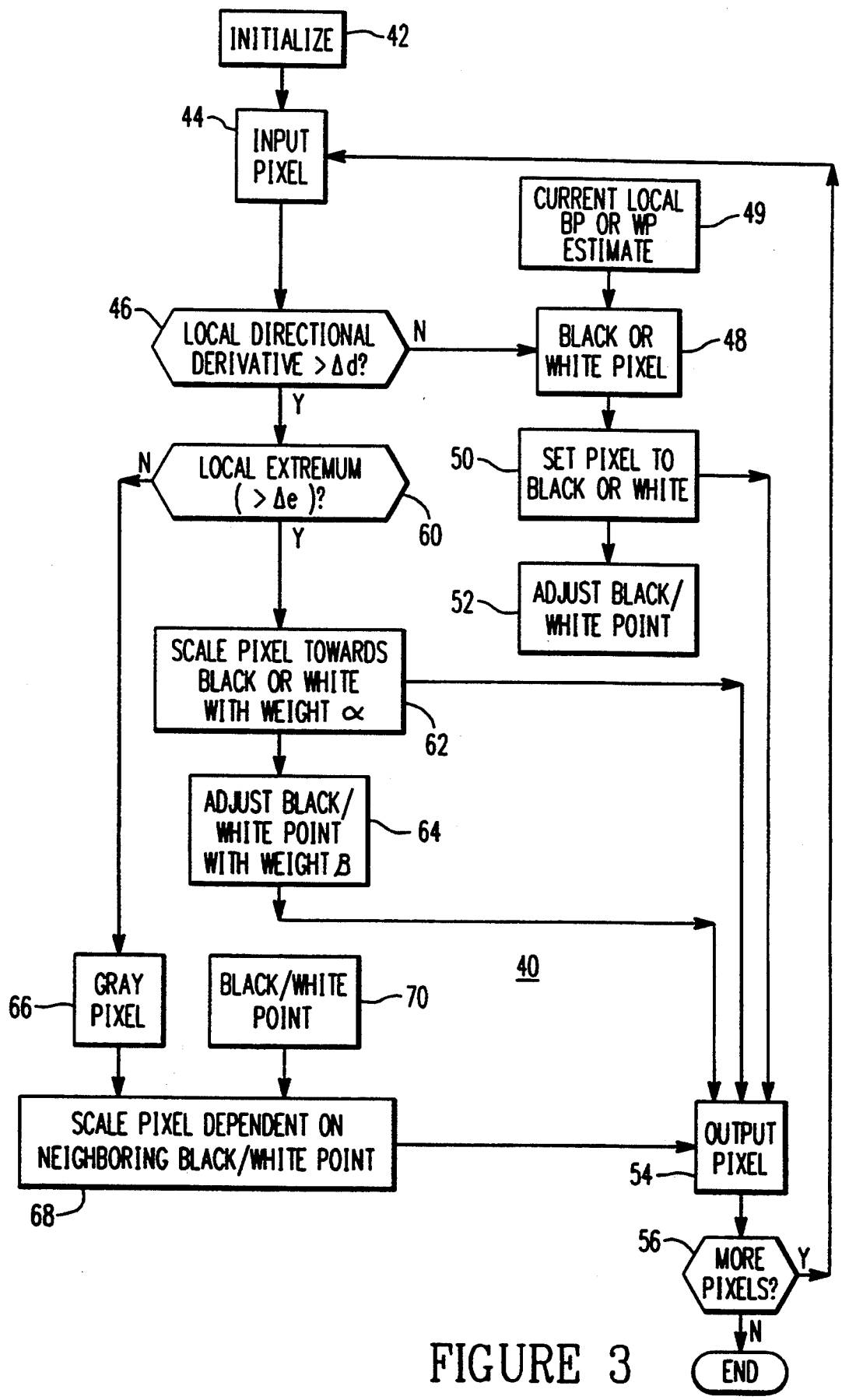
FIG. 3 shows a flow chart illustrating in greater detail procedures employed in the system and process of FIGS. 1 and 2.
Figure 4A:
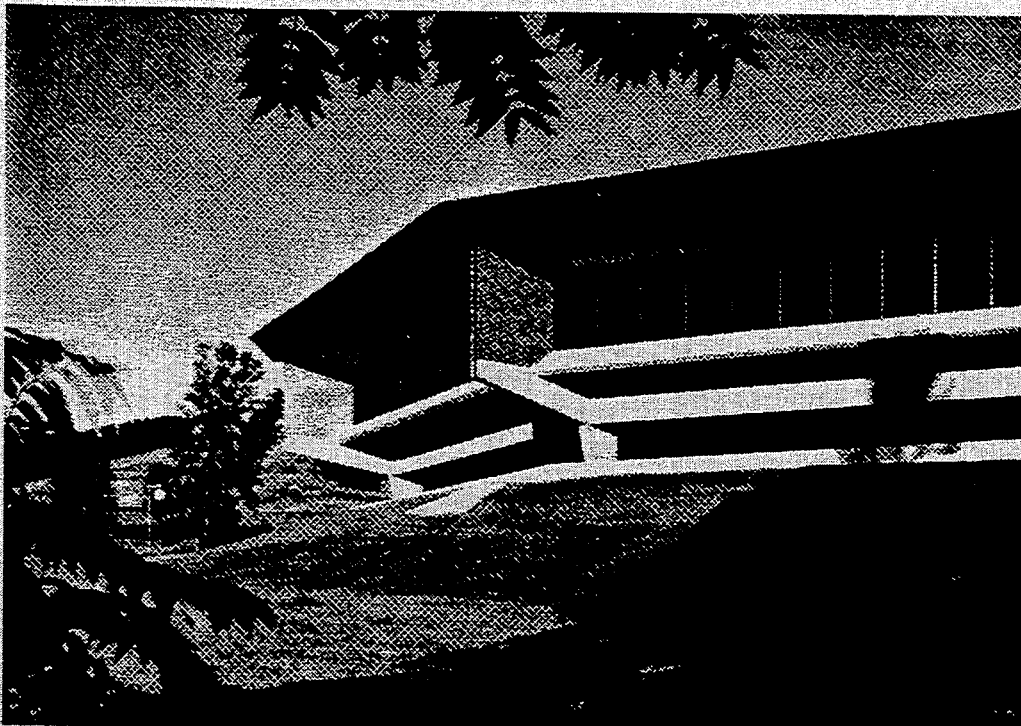
FIG. 4A shows the result of prior art scanning/printing a halftoned picture; large parts of the reproduction are blackened or whitened leading to loss of information.
Figure 5A:
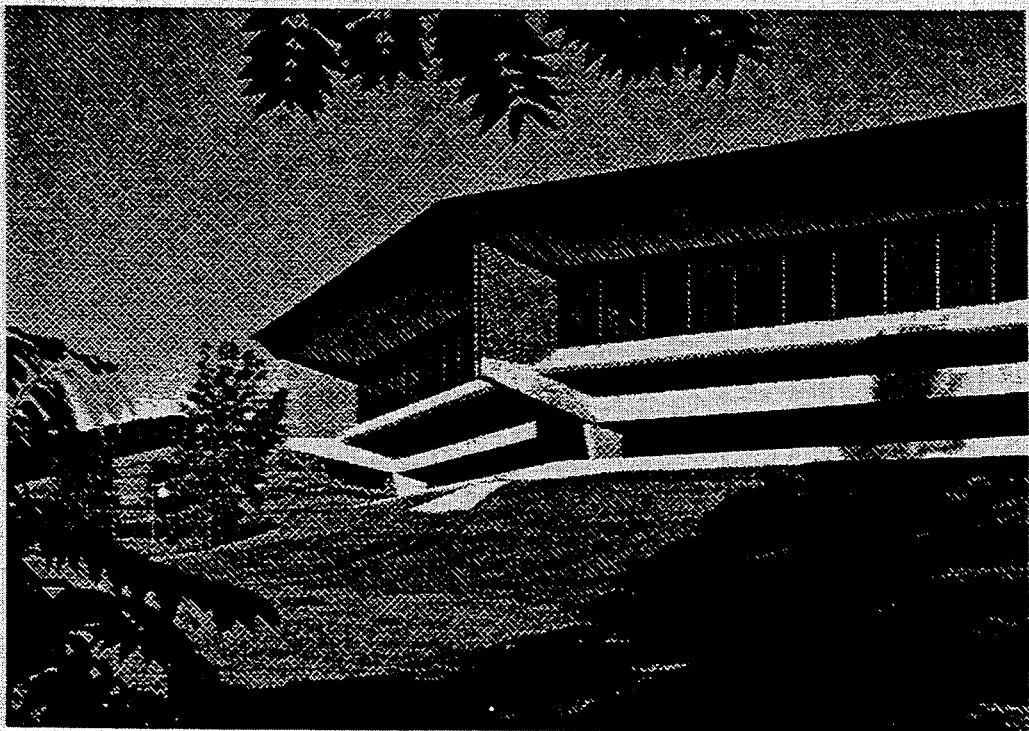
FIG. 5A, as compared to FIG. 4A, shows the result of using the present invention, reproducing the gray scale as well as detail information of the input.
Figure 5B:
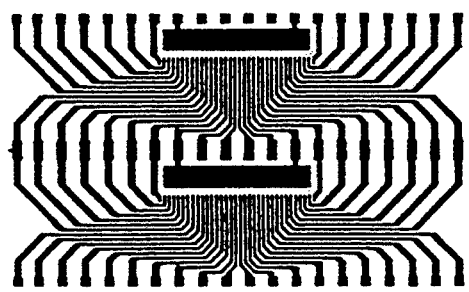
FIG. 5B, as compared to FIG. 4B, shows how use of an algorithm structured in accordance with the present invention reproduces fine lines and spacings present in the original.
Figure 4B:
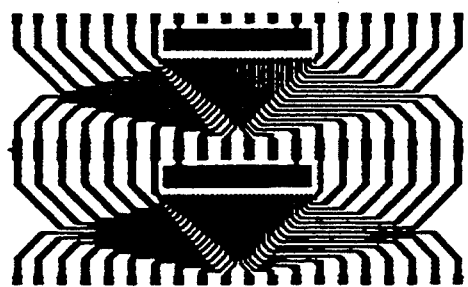
FIG. 4B shows the result of prior art scanning/printing a circuit layout, where fine lines are lost in the reproduction.

In this way, each pixel of the input can be assigned to be black, white, or edge (gray). The edge pixels are then readjusted corresponding to the local black and white points determined from surrounding pixels that are recognized as being black or white. FIG. 3, shows a flow diagram for an algorithm preferred for implementing a procedure in accordance with the present invention.

In accordance with the preferred algorithm, the directional derivatives of the input pixel are compared to a selected value of a threshold $\Delta d$ and the pixel is classified as "constant area" or "edge", with the "edge" classification including local extrema.

The threshold $\Delta d$ is a measure of local image variation. A pixel is at an edge when the derivative of the image function is larger than a threshold $\Delta d$, as described, for example, in U.S. Pat. No. 4,654,721, col. 5, lines 2 5-35 or U.S. Pat. No. 4,958,238, col. 6, lines 4-11. The selected value for the threshold $\Delta d$ is therefore determined by the image requirements. In a binary system, the selected value of Δd is generally arbitrary, but necessarily falls within a value range, i.e., from a value larger than the system noise to a value smaller than the system maximum.

The local extremum pixels (i.e., pixels which are either local minimums or local maximums) are determined by comparison to the other pixels in the area. A pixel is classified as a local extremum when it has a value Δe larger or smaller than the surrounding pixels.

False detection of noise as an edge is a problem commonly faced in general image processing applications. Thus, the value Δe is used as a threshold to check whether an extremum is an edge or an error. In a binary system, the value Δe is generally arbitrary, but necessarily depends on the level of noise signals, i.e., a selected value of Δe that is too low may allow noise to be detected as an edge.

Pixels classified as edge are then checked to determine whether they are a local extremum by being Δe larger (maximum) or smaller (minimum) than the surrounding pixels. If the difference is less than Δe, the pixel is a non-extremum edge pixel. To determine each pixel value and the value a white area (whitepoint) or a black area (blackpoint) would yield at the pixel position, the pixels are preferably processed according to their classification as follows:

a. Constant Area Pixels

Pixels that have a directional derivative which does not exceed the threshold Δd have to be either black or white since the input was binary and thus had no extended gray regions. The decision whether the pixel is actually black or white is made by comparing the pixel to a larger neighborhood such as 10×3 pixels. If the actual pixel is above the local average by more than a threshold, then the pixel is set to white (black). If the pixel is below the local average by more than the threshold, the pixel is set to black. If the pixel is above the local average by more than the threshold, the pixel is set to white. Otherwise the pixel is set to white or black depending on (a) the difference between the pixel and the local blackpoint or the local whitepoint, and (b) decisions made as to whether neighboring "constant area" pixels, if any, are black or white. The local blackpoint or the local whitepoint is generated by using a weighted average of the blackpoints or a weighted average of the whitepoints of already processed pixels in a pixel neighborhood, such as one that is 3×3 pixels. After the decision whether the pixel is actually black or white is made, the pixel is written to the output and its original value is used to readjust the local blackpoint or the local whitepoint. This is done by setting the blackpoint to a weighted average of the calculated blackpoint the local blackpoint before the pixel was classified or by setting the whitepoint to a weighted average of the calculated whitepoint and the local whitepoint before the pixel was classified. A readjustment is made because the input value is known to be black (or white) and therefore the scanner response to black (or white) at that pixel is known and the response is assumed to be constant in a neighborhood of m×n pixels such as 5×3.

b. Local-extrema Pixels

The value of pixels classified as local extrema is readjusted corresponding to the value of the black/whitepoint at that location. Here, the amount by which the pixel differs from its surrounding is used as an additional criterion to determine the actual readjustment. The black/whitepoint of the neighborhood, such as 3×3 pixels, is readjusted by setting the black/whitepoint to a weighted average of the local black/whitepoint before the pixel was classified and the calculated black/whitepoint.

c. Gray Pixels

All pixels that are not classified under one of the above groups are considered to be gray. The values of these pixels are readjusted using the local black/whitepoint, where the readjustment can be done by a linear function or more general functions such as power laws. The effect of readjusting the data using a power law is to darken or lighten the image. The local black/whitepoint is constructed by averaging over previous black/whitepoints, including an optional biasing towards black or white (e.g.: white= $<$white$>$ +bias$_w$, black= $<$black$>$ −bias$_b$, where bias$_w$ is a bias toward white and bias$_b$ is a bias toward black).

The pixel processing classification described above is preferably employed in implementing the invention, but other classifications can be used. For example, in order to reduce noise due to dirt on a page, an additional classifier that uses a small neighborhood around each pixel, plus the classifications made in the neighborhood, can be included in the decision making process.

The result of the pixel processing is a readjusted graytone image that can be used by itself in the system. In printing/copying applications, however, the graytone image is then reduced to binary level (or n-level) using a conventional edge enhanced error diffusion algorithm, which is preferable to using the conventional standard error diffusion since the enhancement leads to a better dot-structure in the reproduction of halftones.

PROGRAMMED COMPUTER PROCEDURE FOR CLASSIFYING AND PROCESSING SCANNED HALFTONE IMAGE DATA

A procedure 40 shown in FIG. 3 sequentially processes input pixels, until all pixels have been processed, to determine and thereby restore original black and white areas for the halftone image where those areas have been modified as a result of scanner and/or printer caused errors or page artifacts such as faded inks. At edges, restoration of original black and white pixels sharpens and thus significantly improves the quality of prints or copies made from output images generated by the procedure 40.

A pixel classification system is employed in the procedure 40 so that pixels in each classification can be logically processed according to that classification to achieve the described results. Specifically, it is preferred that pixels be classified as constant area or edge area pixels. In turn, edge area pixels are classified as local extremum pixels or local nonextremum pixels.

At edges, pixels that should be black or white typically will be gray as a result of scanner averaging as previously described. The concept of an "extremum" pixel is based on the fact that a pixel that was originally black will have a maximum gray value and a pixel that was originally white will have a minimum gray value. Hence, the "extremum" pixels should be logically processed differently from other neighboring "nonextremum" pixels.

In a block 42, initialization is performed with estimated black and white reference points being set for use in the execution of the procedure 40. A weighted average of the previously calculated black and white points of neighboring pixels is used in the estimation of the local black and white reference points. A block 44 then obtains data for the first pixel in the input image.

A classification test block 46 determines whether the pixel is a constant area pixel or an edge area pixel. The local directional or spatial derivative (gradient) is compared to a predetermined threshold derivative level $\Delta d$. If the local gradient is greater than the threshold level $\Delta d$, the pixel is classified as an edge area pixel indicating that black/white transition occurs in that area. Otherwise, the pixel is classified as a constant area pixel since it is in an area where only small tone variations exist.

A constant area pixel is processed in a block 48 to determine whether it is black or white, by comparison of its input value to the current estimated black and white local reference points from a block 49. A block 50 accordingly sets the pixel to the pixel output value which is the most black or the most white value in the system gray scale.

Each pixel has its own estimated individual white reference point WP and its own estimated individual black reference point BP. The estimated individual reference point for the currently processed constant area pixel is set to the input value for the pixel once the black/white determination is made by comparison to the estimate of the local neighborhood BP or WP by the block 48. For example, if the input value for a pixel is 24, and the pixel is set to black in the block 50, the individual black reference for the pixel becomes 24.

The estimated local blackpoint (BP) or whitepoint (WP) reference in the block 49 is preferably calculated as follows:

Estimated BP=Weighted Local Average of
Individual BPs for Processed Pixels+Offset Estimated WP=Weighted Local Average of
Individual WPs for Processed Pixels+Offset Generally, the offset is biased toward black for the BP calculation and it is biased toward white for the WP calculation, and is selected to provide reduced sensitivity to noise.

After the block 50, the newly set pixel is recorded as an output pixel in a block 54 and a block 52 adjusts the estimated local black/white reference points that had been used in the block 49 to determine whether the current pixel was black or white, and the adjusted values are used in the estimation of subsequent black/white reference points. Preferably, the adjustment of the estimated black or white local reference point value, for use in processing the next pixel, is made in accordance with the above calculation, i.e., it is ultimately an appropriately weighted average of neighborhood pixel reference point values as they become determined in the execution of the procedure 40. The local "neighborhood" can be a set of surrounding pixels, such as a 3×3 block of pixels.

After a current constant area pixel is processed as described, the following pixel reference point data is set for the pixel:

if the pixel was black:
BP=pixel input value
WP=estimated local WP if the pixel was white:
WP=pixel input value
BP=estimated local BP A test block 56 checks for more pixels to be processed. If all pixels have not been processed, a return is made to the block 44 where processing for the next pixel is begun. Generally, pixels may be processed by any of various possible pixel sequences, such as the most common one which is row-by-row from left to right. When all pixels have been processed, the procedure 40 is completed and the output image is stored for subsequent halftoning by error diffusion as previously indicated, or by any other suitable density preserving halftoning method.

Each edge area pixel is checked in a test block 60 to determine whether it is a local extremum that should be black or white. A local minimum or maximum is detected if the current pixel value is greater than neighboring pixels by a magnitude greater than a predetermined $\Delta e$ value which serves to distinguish a probable minimum or maximum from noise variations.

If a local extremum is detected, a block 62 scales the pixel value toward black or white with a weight $\alpha$. Even with the use of the noise threshold $\Delta e$, noise could occasionally be the cause of an apparent local extremum and the weighting $\alpha$ provides some corrective adjustment in the pixel value while providing some offset against the possibility of noise As an example, $\alpha$ may be set to a value of $\frac{1}{2}$.

After scaling in the block 62, a block 64 adjusts the black or white reference point with an appropriate weight $\beta$, again to offset the possibility of noise, and the newly valued extremum pixel is recorded as an output pixel in the block 54. The procedure 40 then ends or flows as previously described to process the next pixel.

If the edge area pixel is detected to be a local nonextremum by the test block 60, a block 66 classifies the current pixel as a gray pixel. A block 68 then scales the current pixel value toward black or white with a predetermined weight factor in accordance with the current neighboring black/white reference point obtained from a block 70 and the scaled nonextremum pixel is recorded as an output pixel in the block 54. Any additional pixels are then processed as previously described.

In effect, the procedure 40 makes "black" pixels blacker and "white" pixels whiter and converts the pixel gray value from the current reference scale to the output reference scale; i.e., pixels that are identified as "black" are set to an output value corresponding to "black output", such as "0", while the value actually scanned at that point was larger than 0. Pixels that are identified as "white" are set to the most white value, such as 255 (in an 8-bit pixel value system which is employed in the preferred embodiment) while the value actually scanned at that point was actually less than the most white value (255). The weighted scaling of the pixel in the block 68 is performed as follows:

$$\text{Output value} = (\text{Real White} - \text{Real Black}) \times \frac{\text{Input Value}}{(WP - BP)}$$

or, in the preferred embodiment:

$$\text{Output value} = 255 \times \frac{\text{Input Value}}{(WP - BP)}$$

After an edge area pixel is processed, the following reference point data is set for the pixel:

if the pixel was non-extremum:
WP = estimated local WP
BP = estimated local BP
using a calculation like that described for the block 52 if the pixel was maximum in the block 64:
WP = $\beta$ (estimated WP) + (1 − $\beta$) input value
BP = estimated BP if the pixel was minimum in the block 64:
BP = $\beta$ (estimated BP) + (1 − $\beta$) input value
WP = estimated WP The output image from the block 54 provides an adjusted clear gray data image that is generally not yet suitable for printing or copying. Preferably, the referenced error diffusion processing or any other density preserving halftoning method then generates a printable output image from which copies or prints can be made with significant improvement over the prior art.

The foregoing description of the preferred embodiment of the invention has been presented for purposes of illustration and description. The description is not intended to be exhaustive or to limit the invention to the precise form disclosed, and modifications and variations of the invention are possible in light of the above disclosure or may be acquired from practice of the invention. It is intended that the description provide an explanation of the principles of the invention and its practical application to enable one skilled in the art to use the invention in various embodiments and with various modifications as are suited to the particular use contemplated. It is intended that the scope of the invention be defined by the claims appended hereto, and their equivalents.

What is claimed is:

1. An image processing system for scanning and reproducing halftone images, said system comprising:
   means for scanning an input halftone image to generate an input image having gray content according to a gray scale;
   first means for detecting whether each pixel processed from the input image is a constant area pixel or an edge area pixel;
   means for estimating a local black/white reference point for each pixel being processed as a function of individual black/white reference point values for pixels in a predetermined neighborhood of the pixel being processed;
   second means for detecting whether each constant area pixel has an input value that makes it a white pixel or a black pixel relative to the local current black/white reference point estimated by the estimating means for each detected constant area pixel;
   third means for modifying the input value of each detected constant area pixel to a predetermined white value or a predetermined black value according to whether a white or black pixel value is detected by said second detecting means;
   means for setting the value of an individual black/white reference point for each detected constant area pixel to a predetermined value for that pixel;
   fourth means for modifying an input value of each detected edge area pixel as a function of the local black/white reference point estimated by said estimating means for said each detected edge area pixel;
   means for adjusting the estimated black/white local reference point for each of at least some detected edge area pixels; and
   means for storing the modified constant and edge area pixels from said third and fourth means as a modified image for output processing.

2. The image processing system of claim 1 wherein said setting means sets the predetermined value of the individual black/white reference point of each detected constant area pixel equal to the input value of that pixel.

3. The image processing system of claim 1 wherein said adjusting means sets each individual pixel black/white reference point to a weighted average of the individual black/white reference points for pixels in a predetermined neighborhood of the processed edge area pixel including the input value thereof.

4. The image processing system of claim 1 wherein said estimating means estimates the local black/white reference point for each processed pixel as a weighted average of the individual black/white reference points of pixels in a predetermined neighborhood of the processed pixel.

5. The image processing system of claim 4 wherein said estimating means for the local black/white reference point biases the weighted average toward black/white.

6. The image processing system of claim 1 wherein said third modifying means sets a white input value to the most white value or a black input value to the most black value in the gray scale employed in the image processing system.

7. The image processing system of claim 6 wherein the gray scale is an 8-bit gray scale and the most black value is 0 and the most white value is 255.

8. The image processing system of claim 1 wherein said fourth modifying means includes:
   fifth means for detecting whether each edge area pixel is a local-extremum or a nonextremum;
   sixth means for changing the value of each edge area pixel that is a local-extremum pixel as a function of the estimated local black/white reference point;
   seventh means for changing the value of each edge area pixel that is a nonextremum pixel as a function of the estimated local black/white reference point; and wherein
   said adjusting means adjusts the estimated local black/white reference point as a function of an input value of each local-extremum pixel by the fifth means.

9. The image processing system of claim 8 wherein said sixth changing means scales the value of each extremum edge area pixel toward black or white with a predetermined weighting $\alpha$.

10. The image processing system of claim 8 wherein said adjusting means adjusts the estimated local black/white reference point by scaling a value of the estimated local black/white reference point toward the input value of each local-extremum pixel being processed with a predetermined weighting $\beta$.

11. The image processing system of claim 1 wherein a pixel of said input image is determined to be a constant area pixel if a value of its gradient is less than a predetermined gradient threshold or an edge area pixel if its gradient value is more than the predetermined gradient threshold.

12. The image processing system of claim 10 wherein said seventh changing means scales the value of a nonextremum edge area pixel being processed toward a value of the estimated local black/white reference point with a predetermined weighting.

13. The image processing system of claim 1 wherein means are provided for halftoning said modified image for output printing or copying.

14. The image processing system of claim 13 wherein said halftoning means provides for error diffusing said modified image for output printing or copying.

15. A method for scanning and reproducing halftone images, the steps of said method comprising:
scanning an input halftone image to generate an image having gray constant according to a gray scale;
detecting whether each pixel processed from the input image is a constant area pixel or an edge area pixel;
estimating a local black/white reference point for each pixel being processed as a function of individual black/white reference point values for pixels in a predetermined pixel neighborhood of the pixel being processed;
detecting whether each constant area pixel has an input value that makes it a white pixel or a black pixel relative to the estimated local black/white reference point for the detected constant area pixel;
modifying the input value of each detected constant area pixel to a predetermined white value or a predetermined black value according to whether a white or black pixel value is detected the second detecting step;
setting the value of an individual black/white reference point for each detected constant area pixel to a predetermined value for that pixel;
modifying an input value of each detected edge area pixel as a function of the estimated local black/white reference point for said each detected edge area pixel;
adjusting the estimated local black/white reference point for each of at least some detected edge area pixels; and
storing the modified constant and edge area pixels from the modifying step as a modified image for output processing.

16. The method of claim 15 wherein the modified image is halftoned for output printing or copying.

17. The method of claim 16 wherein the modified image is error diffused for output printing or copying.

* * * * *